United States Patent [19]

Farrell et al.

[11] Patent Number: 5,717,841
[45] Date of Patent: Feb. 10, 1998

[54] METHOD AND APPARATUS FOR PROVIDING OPERATOR SELECTED DEFERRED ACTION FOR INACTIVE PRINT JOBS

[75] Inventors: Michael E. Farrell, Ontario; Randall R. Hube; John F. Gauronski, both of Rochester, all of N.Y.

[73] Assignee: Xerox Corporation, Stamford, Conn.

[21] Appl. No.: 612,648

[22] Filed: Mar. 8, 1996

[51] Int. Cl.[6] .................................................. G06K 15/00
[52] U.S. Cl. ............................ 395/114; 395/115; 395/112
[58] Field of Search ................................. 395/114, 112, 395/101, 113, 115, 116, 117, 111; 358/448, 468, 404, 407, 444, 408, 450, 434, 437, 403, 406, 467; 347/142; 399/1, 8

[56] References Cited

U.S. PATENT DOCUMENTS

| | | | |
|---|---|---|---|
| 4,843,571 | 6/1989 | Notermans et al. | 395/117 |
| 5,133,048 | 7/1992 | Parsons et al. | 395/111 |
| 5,159,395 | 10/1992 | Farrell et al. | 399/401 |
| 5,161,037 | 11/1992 | Saito | 358/468 |
| 5,287,194 | 2/1994 | Lobiondo | 395/114 |
| 5,563,986 | 10/1996 | Suzuki | 395/114 |

*Primary Examiner*—Edward L. Coles Sr.
*Assistant Examiner*—Dov Popovici
*Attorney, Agent, or Firm*—Oliff & Berridge

[57] ABSTRACT

A job processing method and apparatus are provided for allowing an operator of an electronic reprographic system to be able to select deferred actions for inactive print jobs which are automatically initiated upon the detection of a specified triggering event. The job processing instruction set associated with the inactive job is implemented as soon as system resources are available after detection and identification of the triggering event. The triggering event can be one of a predetermined set of system operating conditions.

18 Claims, 13 Drawing Sheets

METHOD AND APPARATUS FOR PROVIDING OPERATOR SELECTED DEFERRED ACTION FOR INACTIVE PRINT JOBS

1. Field of the Invention

The present invention is directed generally to providing deferred actions, such as, for example, reminder messages and/or processing instructions, for designated inactive print jobs. Specifically, the present invention relates to providing an operator with a variety of deferred action options that are automatically implemented upon the occurrence of an operator selected automatic triggering event, such as, for example, date and time, resource availability, operator logoff, etc.

2. Background of the Invention

Modern electronic reprographic systems provide users with the ability to save large numbers of print jobs in the systems' memory. Therefore, these systems can contain a total number of jobs greater than the number of jobs that are capable of being processed at one time (i.e., scanned, edited, printed, etc.) by the system. Typically, these types of electronic reprographic systems contain many inactive jobs at various stages of completion in the system memory. Jobs may be inactive for many reasons, such as, for example: waiting for a customer review and approval of proofs so that final printing can be performed; waiting for a customer to supply additional job content; completed jobs waiting for removal from the system (i.e., either to be archived or deleted); retention on the system for a short period in case customer requests additional copies; etc.

More modern and complex electronic reprographic systems, such as, for example, the DocuTech series of electronic reprographic printers by Xerox Corporation, hold all inactive jobs in a single directory or job file. The operator can select one job at a time in the directory and request that a single operator action (i.e., copy to Print Queue, Delete, Edit, Archive, etc.) be performed on that job. The operator action begins immediately and another job cannot be selected until the operator action is completed on the current job.

Unfortunately, if a specific action cannot be performed at the current time due to some outside constraint as described above, the operator must work on the job at a later time when the action can be performed. This requires operators to maintain extensive and accurate notes, either mentally or on a written log, as to what the next processing step is for each inactive job in the system memory. Without an accurate system for remembering what is required for any particular inactive job, it is nearly impossible to match desired deferred actions to a particular inactive job. In addition, matching deferred actions to particular inactive jobs becomes increasingly difficult (and time consuming) as the number of inactive jobs and deferred actions for those jobs increases.

In view of the above problems relating to deferred action for inactive jobs, what is needed is a tool or mechanism that assists operators to more efficiently manage the inactive jobs in the system. Specifically, operators need to be able to specify that certain currently understood actions are to be performed on a given job at a later time and to have the selected actions performed automatically (e.g., upon the actuation of some trigger mechanism) if desired.

Currently, systems such as DocuTech provide a general use comment field which can be linked to a particular job and used to note the job status. However, this comment field is not automatically displayed in response to any predetermined action the operator may select. Therefore, when using the comment field the operator is still required to make mental or written notes and must recheck the particular job, relying on his memory or handwritten notes. Moreover, the current system does not interpret and react to the comment field, i.e., it is a completely passive system.

What is needed is a system that interprets the requirements of an inactive job as selected by the operator, and then, based upon a predetermined triggering event (also selected by the operator), automatically processes the inactive job in accordance with the preselected processing functions that are identified for a particular inactive job.

SUMMARY OF THE INVENTION

In order to overcome the above and other problems and deficiencies with respect to electronic reprographic systems, the present invention provides an apparatus and method for providing operator selected deferred actions for inactive jobs that are automatically performed on an inactive job in accordance with selected deferred actions upon the occurrence of a specified predetermined triggering event.

It is, therefore, an object of the present invention to provide an electronic reprographic system having the ability to automatically perform preselected deferred actions on an inactive job upon the occurrence of a predetermined triggering event.

It is another object of the present invention to improve operator productivity and efficiency by eliminating redundant checking of an inactive job list and the associated processing required for the inactive jobs manually.

It is another object of the present invention to foster longer periods of unattended system operation by providing an automatic deferred action capability.

It is another object of the present invention to improve system performance, efficiency and speed by reducing the number of inactive jobs stored in the system memory. The number of inactive jobs can be reduced by causing automatic job archiving and deletion upon the occurrence of a predetermined triggering event.

It is a further object of the present invention to increase operator productivity by providing operators with the ability to select deferred actions for inactive jobs. This type of operation is much faster and more efficient than accessing a comment field and performing an action on the job in accordance with the comments.

To realize these and other objects and to overcome the deficiencies set forth above with respect to conventional electronic reprographic systems, an electronic reprographic machine for providing an operator with an automatic deferred action function is provided, comprising means for storing an inactive print job; means for entering a job processing instruction or set of instructions (i.e., at least one instruction) associated with the inactive print job for use at a future time; means for automatically triggering access of the inactive print job and the job processing instruction(s) associated with the inactive print job. Typically, the triggering means is one of a predetermined set of system operating conditions. The electronic reprographic system then processes the inactive print job in accordance with the associated job processing functions, in response to the automatic triggering means.

In addition to the apparatus described above, a method for automatically performing deferred actions on inactive print jobs in an electronic printing system is provided, comprising the steps of: storing an inactive print job; associating a job processing function or set of job processing functions with the inactive print job; selecting a condition (possibly from one of a predetermined set of system operating conditions)

to trigger access of the inactive print job and its associated job processing functions; and processing the inactive job in accordance with the associated job processing functions in response to the triggering event.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

While this invention is described in detail herein with specific reference to certain illustrated embodiments, there is no intent to be limited to those embodiments. On the contrary, the aim is to cover all modifications, alternatives and equivalents falling within the spirit and scope of the invention as defined by the claims.

A. The System

Figure 1:
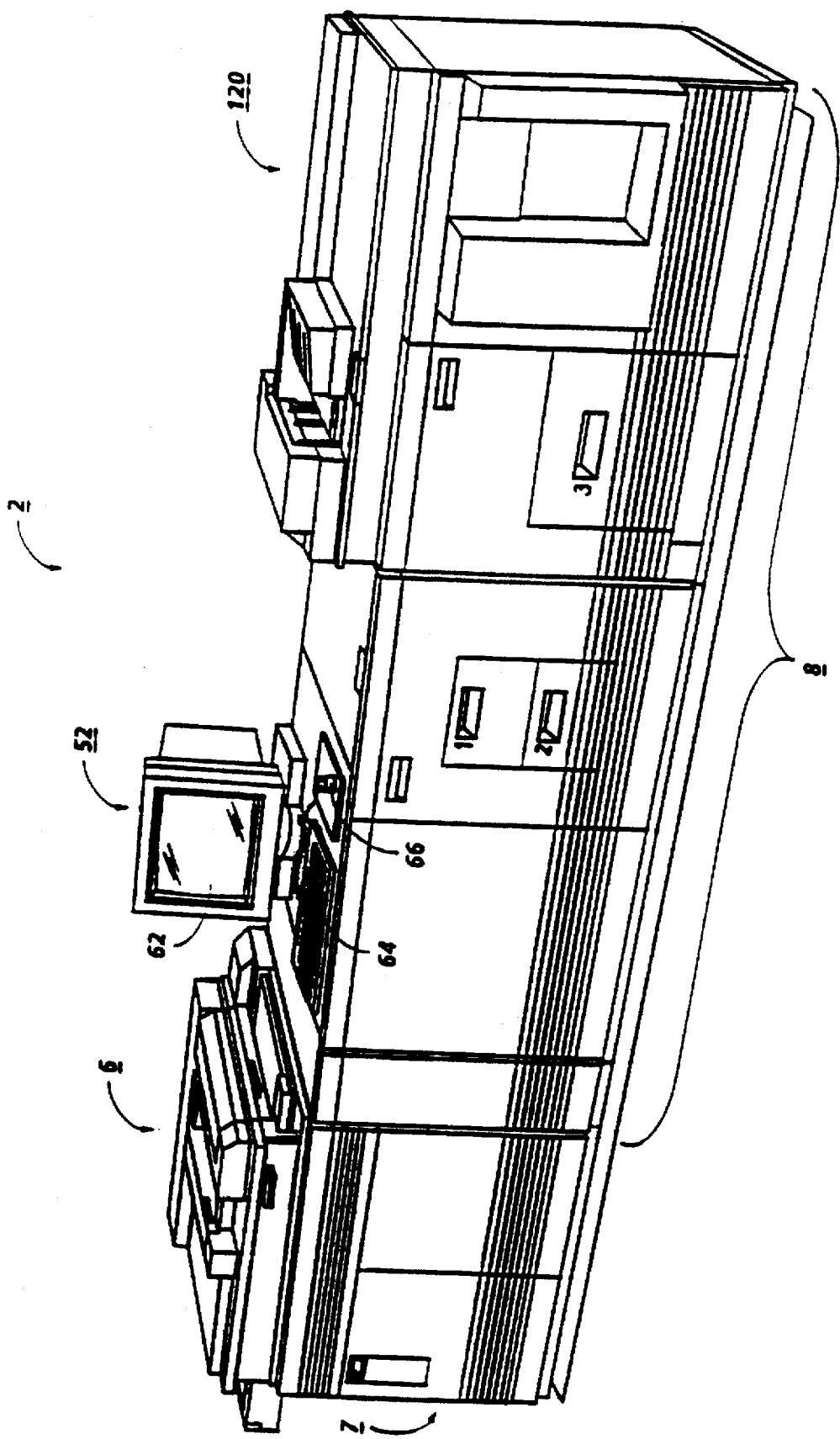
FIG. 1 is a view depicting an electronic printing system.
Figure 2:
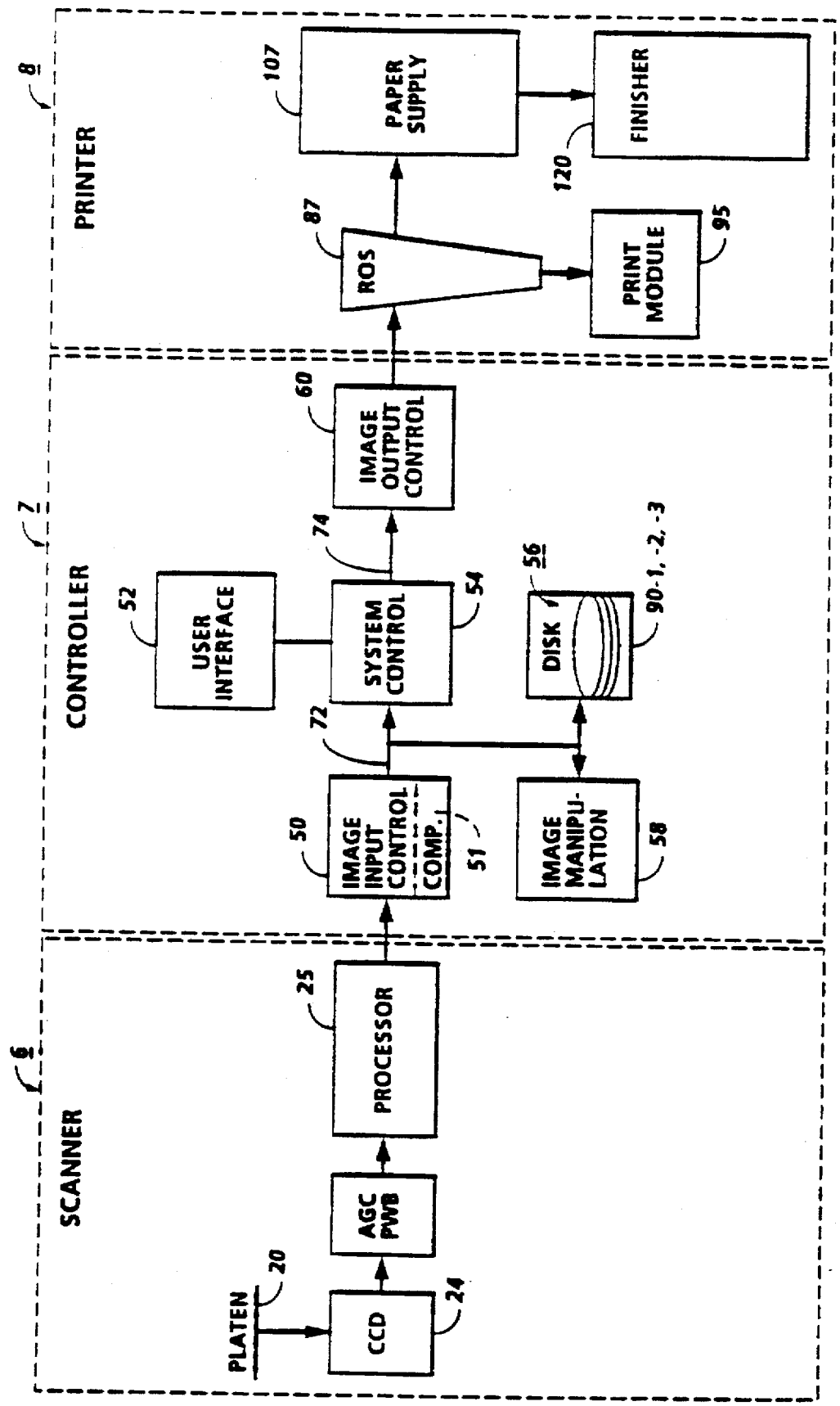
FIG. 2 is a block diagram depicting the major elements of the printing system shown in FIG. 1.

Referring to FIGS. 1 and 2, there is shown an exemplary laser based printing system (or imaging device) 2 for processing print jobs in accordance with the teachings of the present invention. Print system 2, for purposes of explanation, is divided into a scanner section 6, controller section 7, and printer section 8. While a specific printing system is shown and described, the present invention may be used with other types of printing systems such as ink jet, ionographic, etc.

Figure 3:
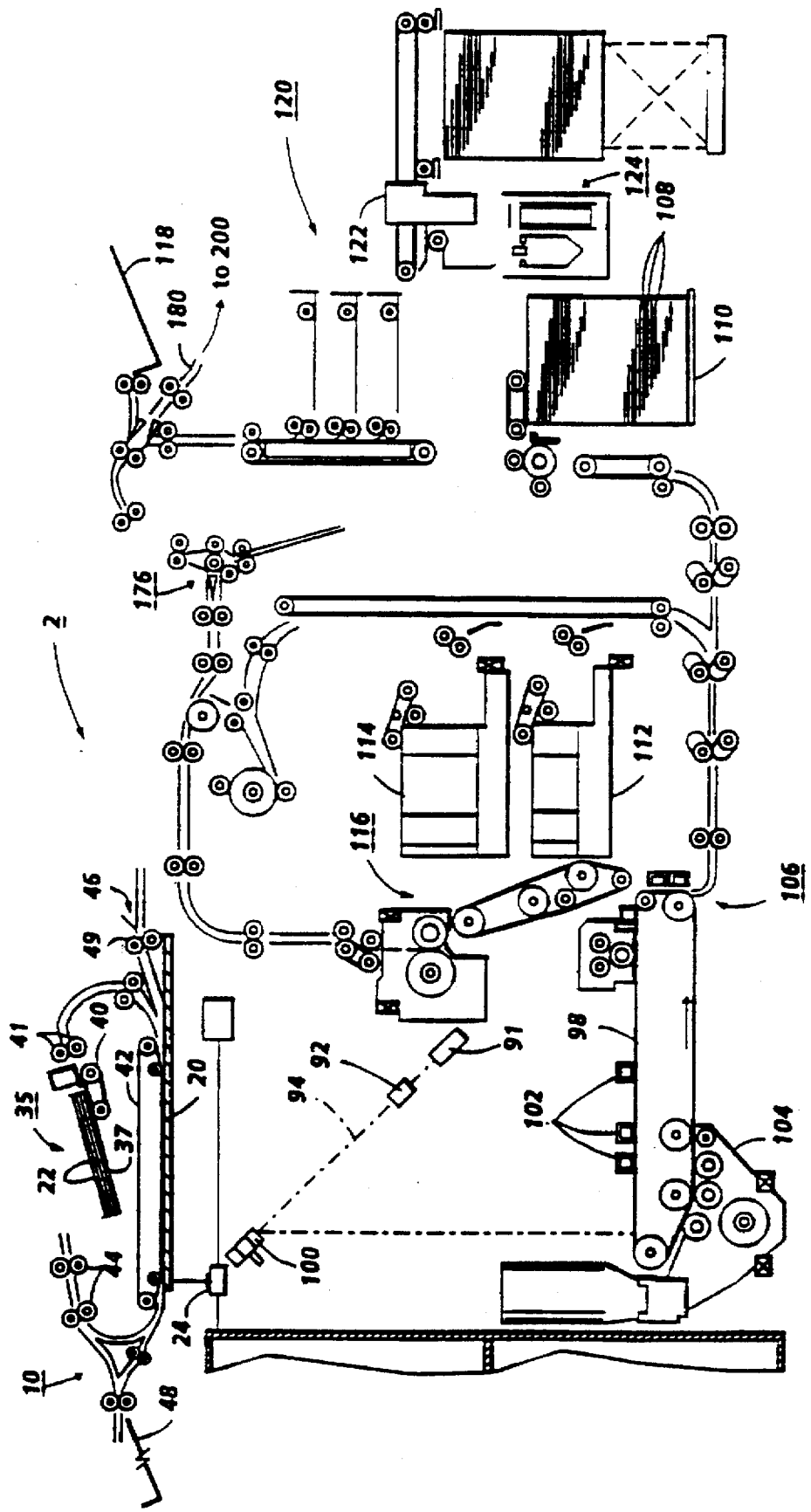
FIG. 3 is a plan view illustrating the principal mechanical components of the printing system shown in FIG. 1.
Figure 4:
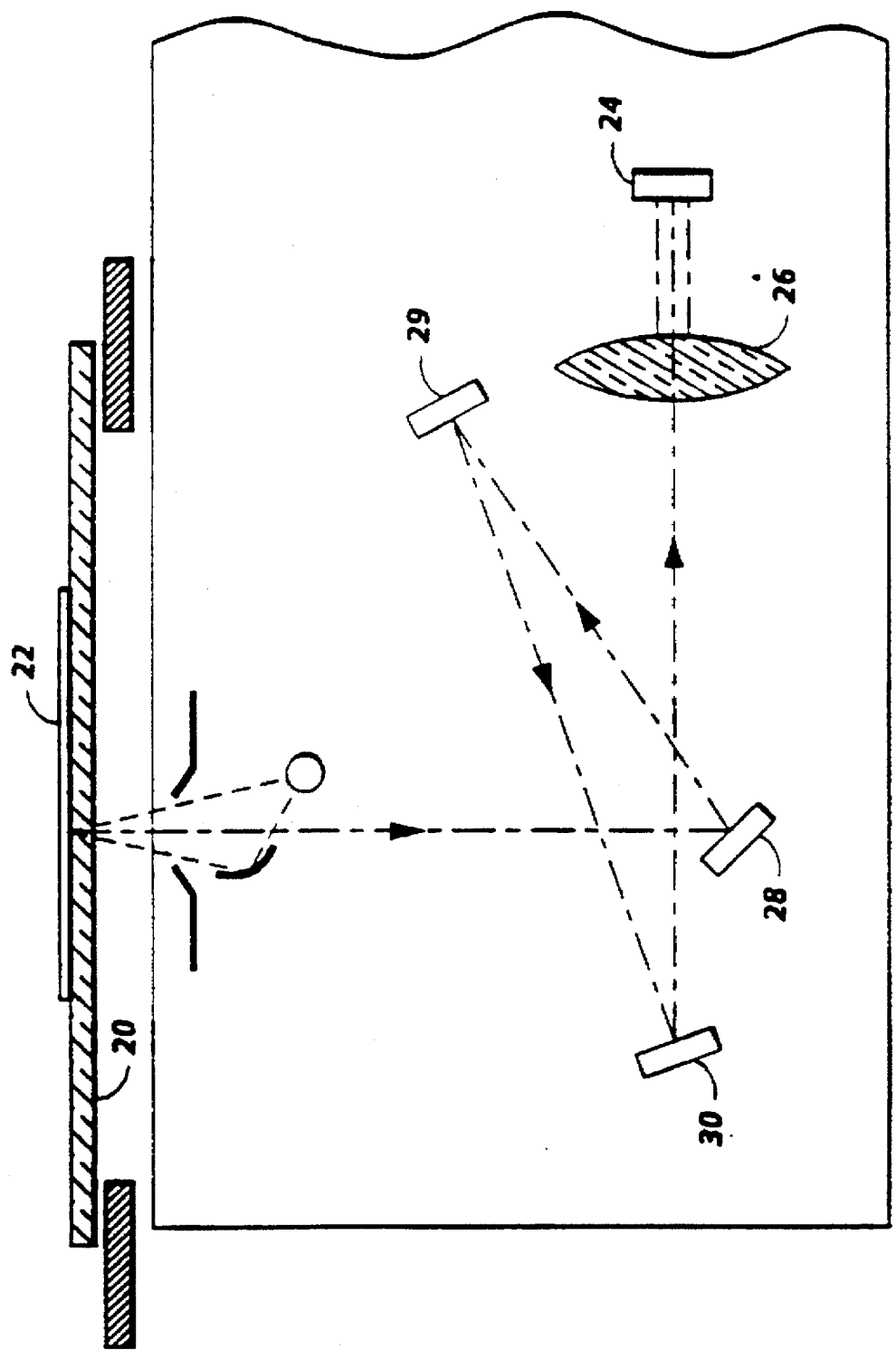
FIG. 4 is a schematic view showing certain construction details of the document scanner for the printing system shown in FIG. 1.

Referring particularly to FIGS. 2–4, scanner section 6 incorporates a transparent surface 20 on which the document 22 to be scanned is located. One or more linear arrays 24 are supported for reciprocating scanning movement below platen 20. Lens 26 and mirrors 28, 29, 30, cooperate to focus array 24 on a line-like segment of platen 20 and the document being scanned thereon. Array 24 provides image signals or pixels representative of the image scanned, which after processing by processor 25, are output to controller section 7.

Processor 25 converts the analog image signals output by array 24 to digital image signals and processes the image signals as required to enable system 2 to store and handle the image data in the form required to carry out the job program. Processor 25 also provides enhancements and changes to the image signals such as, for example, filtering, thresholding, screening, cropping, reduction/enlarging, sharpness, TRC control, halftone screen frequency control, etc. Following any changes and adjustment to the scan related selections in the job programming, the document must be rescanned. Documents 22 to be scanned may be located on platen for scanning by automatic document handler (ADF) 35 operable in either a recirculating document handling (RDH) mode or a semi-automatic document handling (SADH) mode. A manual mode including a book mode and a computer forms feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 42 on the platen 20 where the document is scanned by array 24. Following scanning, the document is removed from platen 20 and returned to the document tray 37 using document transport roller nips 44.

For operation in the CFF mode, computer forms material is fed through slot 46 and advanced by feed rolls 49 to document feed belt 42 which, in turn, advances a page of the fanfold material into position on platen 20.

Referring to FIGS. 2 and 3, printer section 8 comprises a laser type printer and, for purposes of explanation, is separated into a raster output scanner (ROS) section 87, Print Module Section 95, Paper Supply Section 107, and High Speed Finisher 120. ROS 87 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to the modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply Section 107. Media 108 as will appear may comprise any of the variety of sheet sizes, types and color. For transfer, print media is brought forward and into timed registration with the developed image on photoreceptor 98 from either a main paper tray 110 or from auxiliary paper trays 112 or 114. The developed image transferred to the print media 108 is permanently fixed or fused by fuser 116 and the resulting prints discharged to either output tray 118, to High Speed Finisher 120 or through bypass 180 to some other downstream finishing device, which could be a low speed finishing device such as a booklet maker 200. High speed finisher 120 includes a stitcher 122 for stitching or stapling the prints together to form books and thermal binder 124 for adhesively binding the prints into books.

Referring to FIGS. 1, 2, 5A, 6 and 7, controller section 7, for explanation purposes, divided into an image input controller 50, User Interface (UI) 52, system controller 54, main memory 56, image manipulation section 58, and image output controller 60.

The scanned image data input from processor 25 of scanner section 6 to controller section 7 is compressed by image compressor/processor 51 of image output input controller 50 on printed wiring board (PWB) 70-3. As the image data passes through the compressor/processor 51, it is segmented into slices N scan lines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in the system memory 61, which comprises a RAM, pending transfer into main memory 56 where the data is held pending use.

As best seen in FIG. 1, UI 52 includes a combined operator/controller CRT display consisting of an interactive touchscreen 62, keyboard 64, and mouse 66. UI 52 interfaces the operator with printing system 2, enabling the operator to program print jobs and other instructions, to obtain system operating information, programming information, diagnostic information, etc. Items displayed on touchscreen 62 such as files and icons are actuated by either touching the displayed item on screen 62 with a finger or by using mouse 66 to point a cursor to the item selected and keying the mouse.

Main memory 56 has plural hard disks 90-1, 90-2, 90-3 for storing machine Operating System software, machine operating data, and the scanned image data currently being processed. When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make-ready, decomposition, etc. are carried out. Following processing, the data may be returned to main memory 56, sent to UI 52 for display on touchscreen 62, or sent to image output controller 60.

Figure 5A:
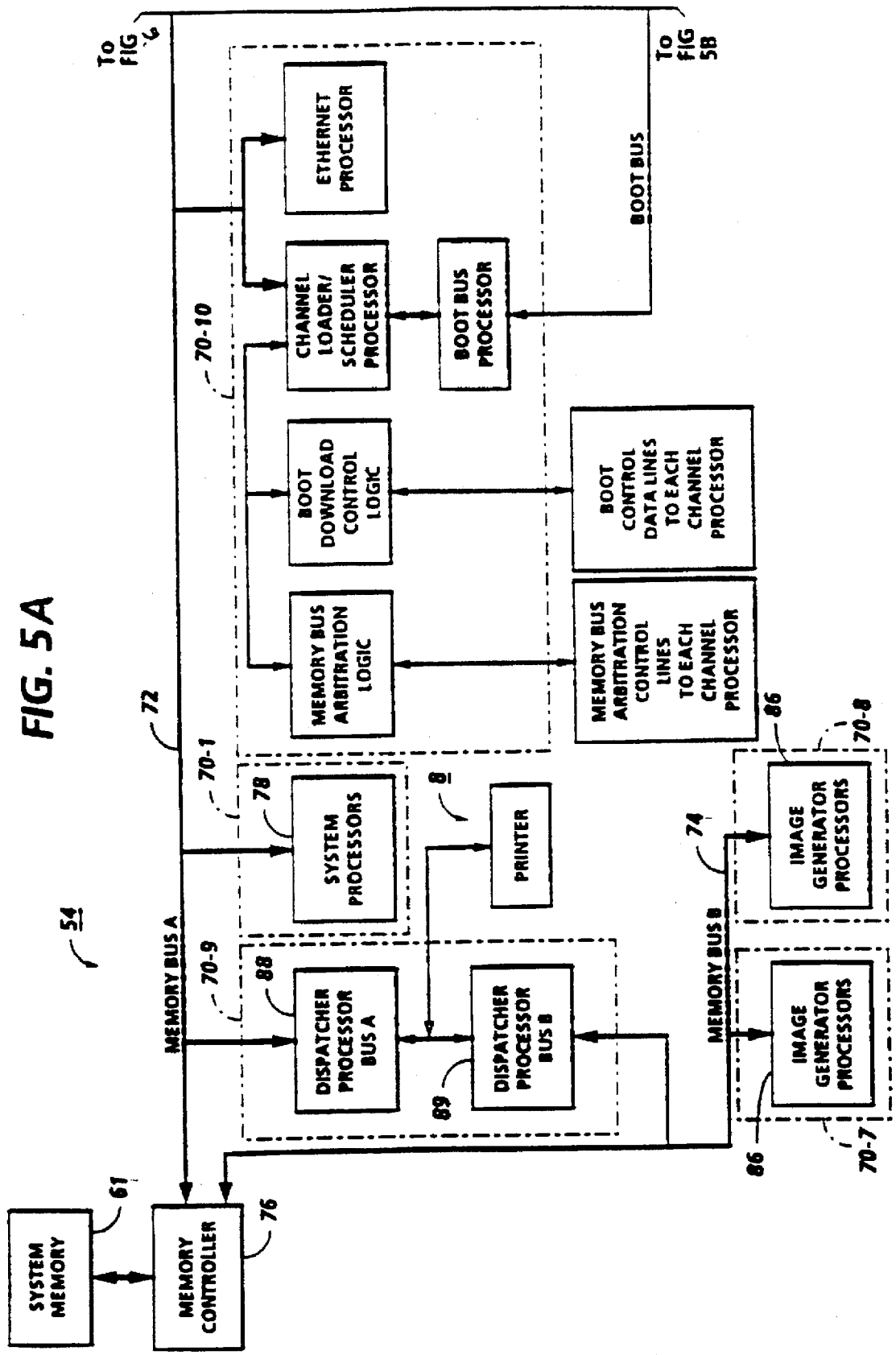
FIGS. 5A, 5B, 6 and 7 comprise schematic block diagrams showing the major parts of the control section for the printing system shown in FIG. 1.

Image data output to image output controller 60 is decompressed and ready for printing by image generating processors 86 of PWBs 70-7, 70-8 (see FIG. 5A). Following this, the data is output by dispatch processors 88, 89 on PWB 70-9 to printer section 8. Image data sent to printer section 8 for printing is normally purged from memory 56 to make room for new image data.

Figure 6:
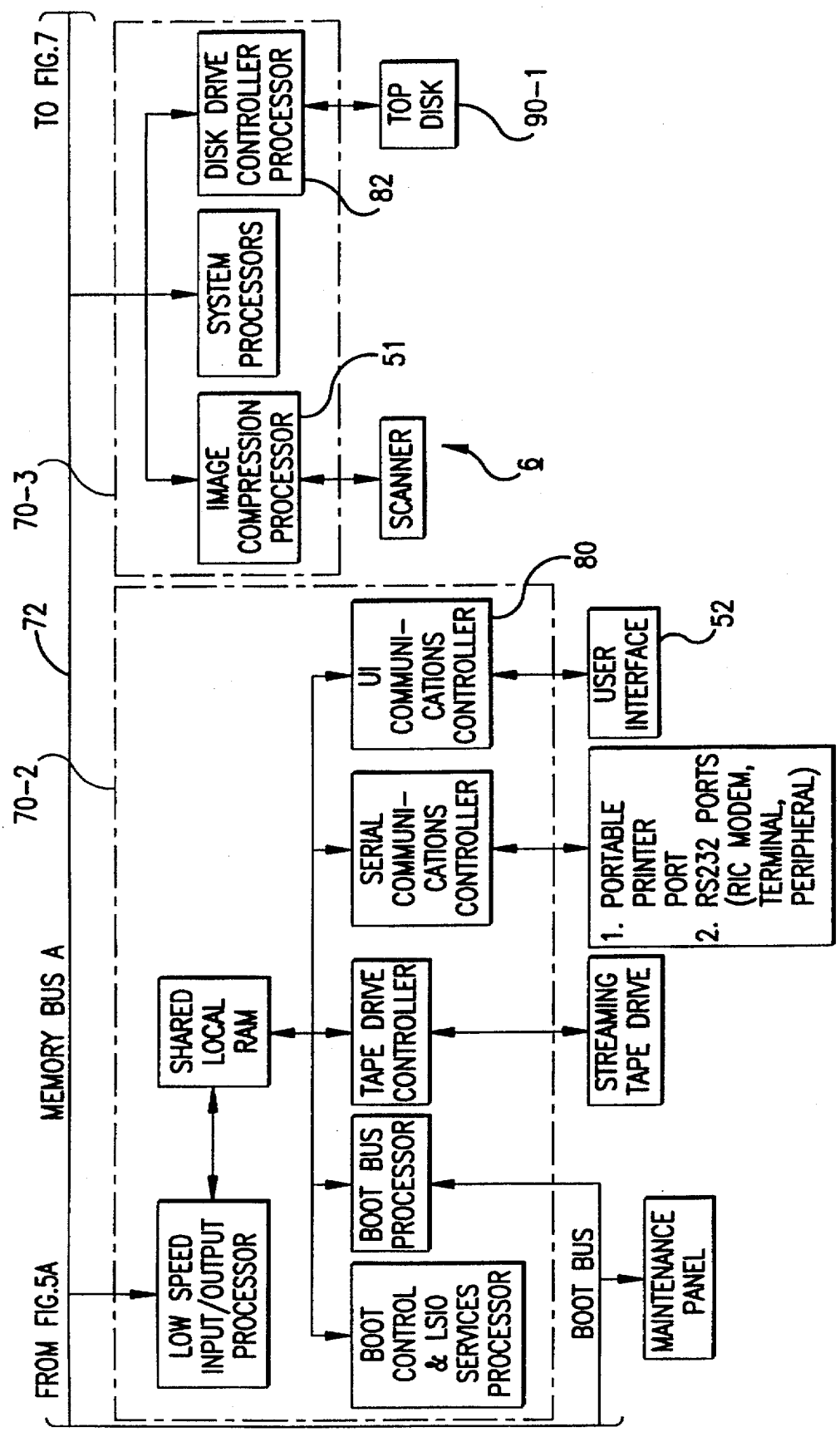
Figure 7:
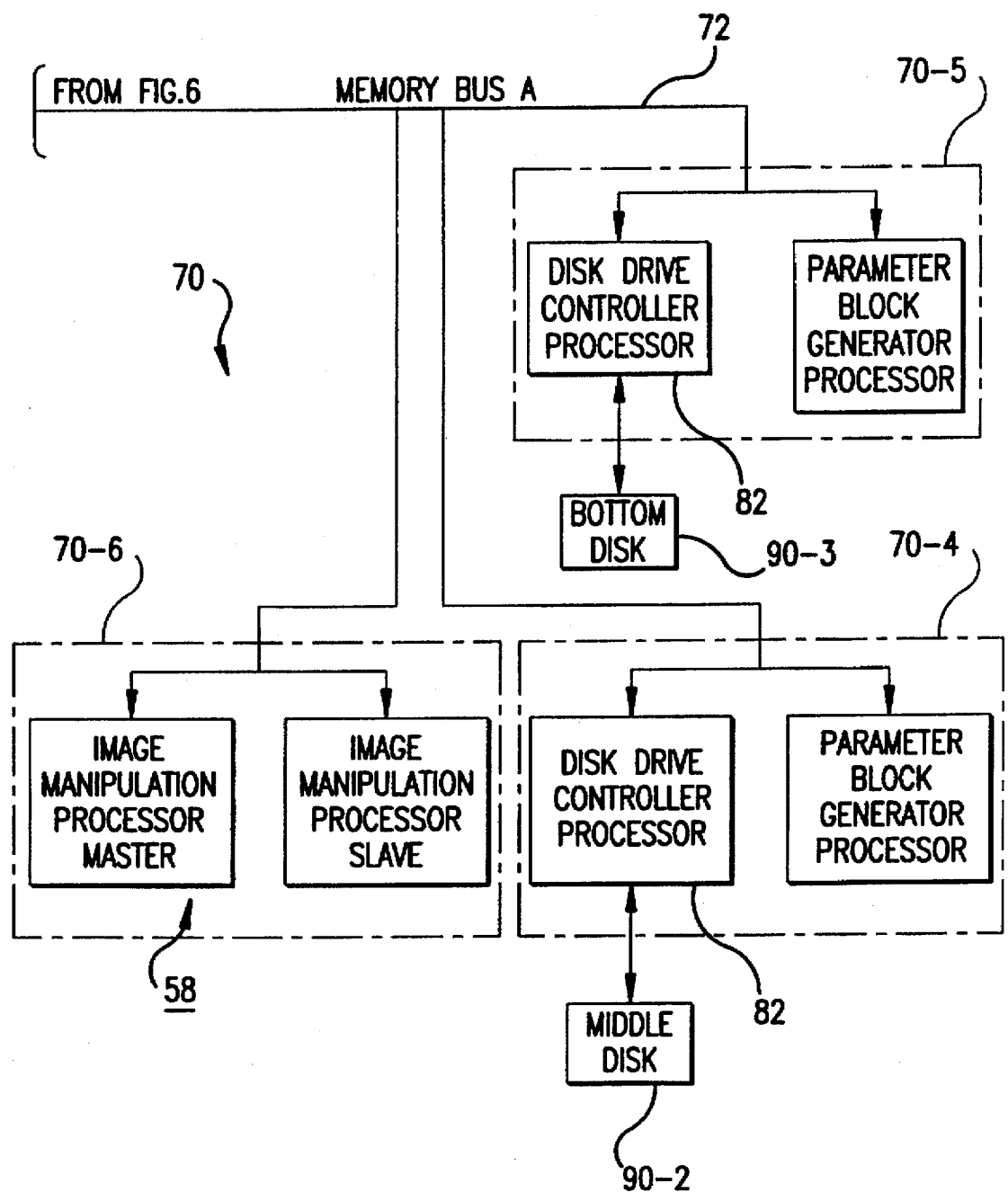

Referring particularly to FIGS. 5A, 6 and 7, control section 7 includes a plurality of Printed Wiring Boards (PWBs) 70, PWBs being coupled with one another and with System Memory 61 by a pair of memory buses 72, 74. Memory controller 76 couples System Memory 61 with buses 72, 74. PWBs include system processor PWB 70-1 having plural system processors 78; low speed I/O processor PWB 70-2 having UI communication controller 80 for transmitting data to and from UI 52; PWBs 70-3, 70-4, 70-5 having disk drive controller/processors 82 for transmitting data to and from disks 90-1, 90-2, 90-3, respectively, of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printing section 8; dispatch processor PWB 70-9 having dispatch processors 88, 89 for controlling transmission of data to and from printer section 8; and boot control-arbitration-scheduler PWB 70-10.

Figure 8:
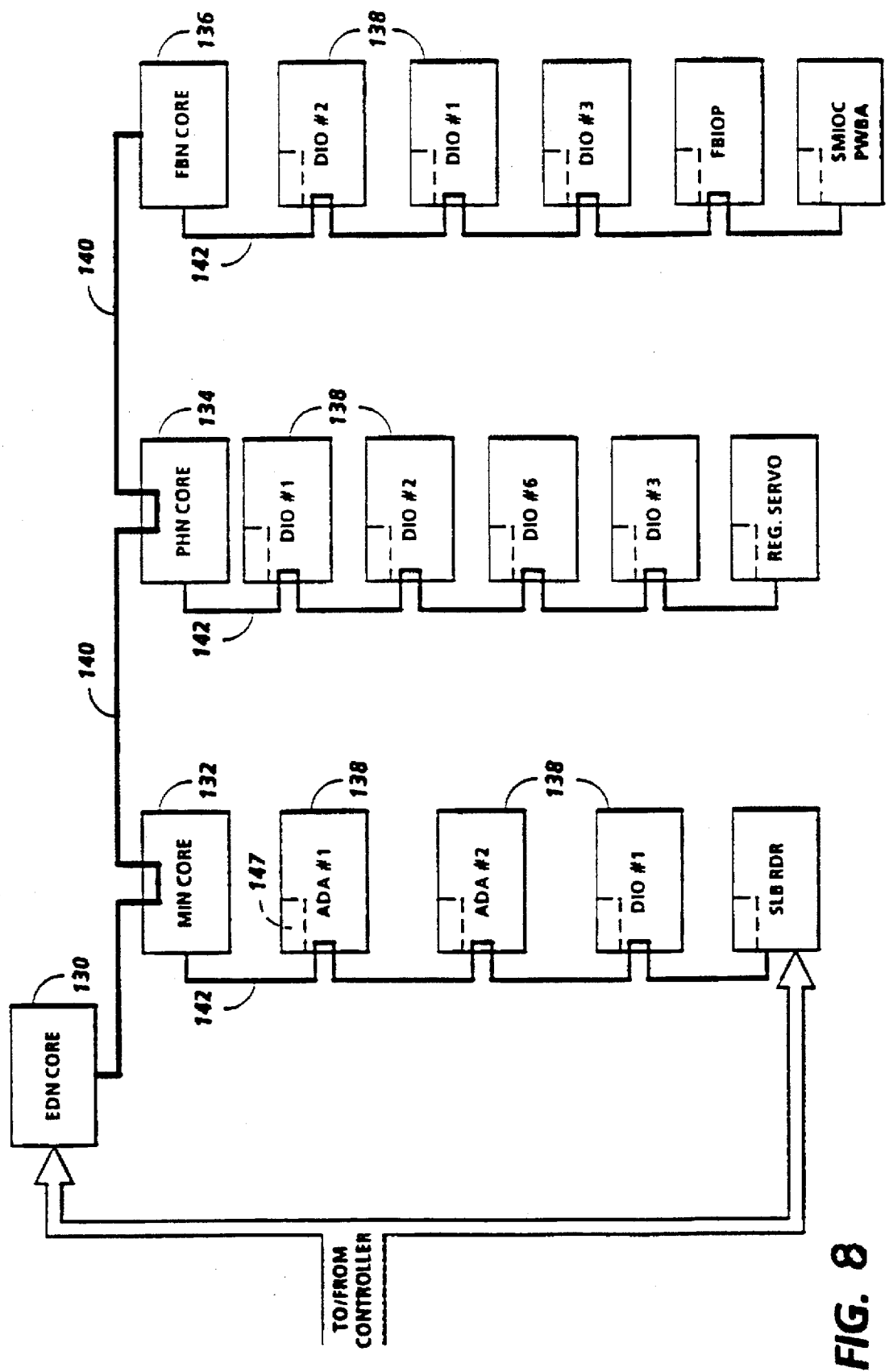
FIG. 8 is a block diagram of the operating system together with printed wiring boards and shared line connections for the printing system shown in FIG. 1.

Referring particularly to FIG. 8, system control signals are distributed via a plurality of printed wiring boards (PWBs). These include EDN (electronic data node) core PWB 130, Marking Imaging core PWB 132, Paper Handling core PWB 134 and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from main memory 56 to EDN core PWB 130 and from there to remaining core PWBs 132, 134, 136 via bus 140, each core PWB 130, 132, 134, 136 having a boot ROM 147 for controlling downloading of Operating System software to PWB, fault detection, etc. Boot ROMs 147 also enable transmission of Operating System software and control data to and from PWBs 130, 132, 134, 136 via bus 140 and control data to and from I/O PWBs 138, via local buses 142. Additional ROM, RAM and NVM memory types are resident at various locations within system 2.

B. Operator Selected Deferred
Action for Inactive Print Jobs

In accordance with the present invention, the operator is provided with the ability to specify deferred actions that will be automatically implemented upon the occurrence of an operator selected triggering event. Therefore, the operator must, at a minimum, select both the future action and the event to trigger that future action. Additional operator selections may be required when an action requires use of additional resources and/or a retry option is specified (e.g., archive a job to a file server or upon failure of action, retry every five minutes, etc.).

When programming the trigger event, the operator will be able to specify the durability of the trigger event. In most cases, the deferred action will occur only for the first occurrence of the trigger event. However, in situations where the operator wants the deferred action to be repeated, the operator can specify that the trigger event should be reused indefinitely. Reusing a trigger event indefinitely would be a convenient method to backup critical documents to a file server once a day.

Some of the potential future actions to be taken, as specified by the operator, include, for example: display a reminder message; delete the job; copy the job to the print queue (i.e., a copy of the job also remains in memory 56); move the job to the print queue (i.e., the job is deleted from memory 56 and stored in the print queue); archive the job; perform any resource intensive task (e.g., rotate all page images in a job 90°); etc. There are also a variety of triggering events that can be specified by the operator. When these triggering events occur, the automatic action specified by the operator will be performed. Some examples of triggering events include, for example: date and time (specified in relative or absolute terms); resource availability (i.e., availability of resources such as, for example, print queues, cartridge tape drives, modems, file servers, finishing devices, fonts, etc.); operator logoff; operator logon; receipt or creation of a specified second print job; system transition to a quiescent state; etc.

The reminder function should support selection of either defined prompts or operator entered text. Defined prompts could be used for the majority of reminder conditions such as, for example, waiting for customer print approval, waiting for shop print approval, waiting for additional job content, etc. When the defined prompt indicates that the job is waiting for customer action, the operator might, for example, enter the name and phone number of the customer contact so that such information would also be displayed or otherwise provided to the operator upon occurrence of the triggering event.

For networked system reprographic products, the invention could act, for example, to automatically send a reminder mailnote to the job submitter whenever a customer action is overdue, or use remote file servers to archive or access inactive jobs. For standalone products with modem communication capability, the invention can provide the ability to automatically call the job's contact person or department and deliver, e.g., a voice synthesized reminder when an inactive job is overdue for customer action.

In addition, the system could be expanded to include the ability to specify multiple sequential deferred actions for inactive jobs and the ability to chain or link multiple deferred actions in a cascading and recursive fashion. Multiple sequential deferred actions may or may not be conditional on the success of the preceding action. One potential application for unconditional multiple sequential deferred actions includes requesting a job to print at a specified time and then to be copied to a file service; it may be desirable to file the job when the printing action ceases regardless of whether the printing action was completed. Another potential application is a request to file a job to one file service in its current format followed by a request to file a copy to a second file service in an alternate format. A conditional multiple sequential deferred action would be useful for initiating irrevocable actions contingent upon the successful completion of a preceding action. Deleting a print job only after it has been copied to a file service is an example of conditional multiple sequential deferred actions.

The electronic reprographic system for providing an operator with a deferred action function is described with reference to FIGS. 1, 2 5A, 5B, 6 and 7. All inactive print jobs with their associated triggers and processing instructions are stored in the main memory 56 of the printing system 2. Alternatively, in networked systems for example, inactive print jobs may reside on a remote file server or the like. The operator defined triggering events and processing instruction set for the inactive print jobs upon which automatic deferred action is to be performed are entered via the User Interface (UI) 52 which, e.g., may be equipped with specialized user friendly screens that provide options for the operator to select. It is understood that instruction set, as used herein, includes a single action. It can also comprise more than one action. The system control 54 provides automatic access of the inactive print job and associated processing instructions when a triggering event is detected by a status monitor which may be part of the system control 54. The status monitor may be, for example, a hardwired circuit capable of monitoring the status of all triggering event possibilities, a programmable processor or the like. The control 54 is also capable of providing a discriminating function to determine whether the detected triggering event is associated with or linked to any of the inactive print jobs stored in the main memory 56. When a triggering event associated with a particular job requiring output has been detected, the system control 54 and image output control 60 then process the inactive job in accordance with the specified deferred actions. If, however the inactive job is to be archived or deleted or otherwise not output, then the system control 54 performs the deferred action. The detailed operation of the system will be described below with reference to FIGS. 9-11.

Figure 5B:
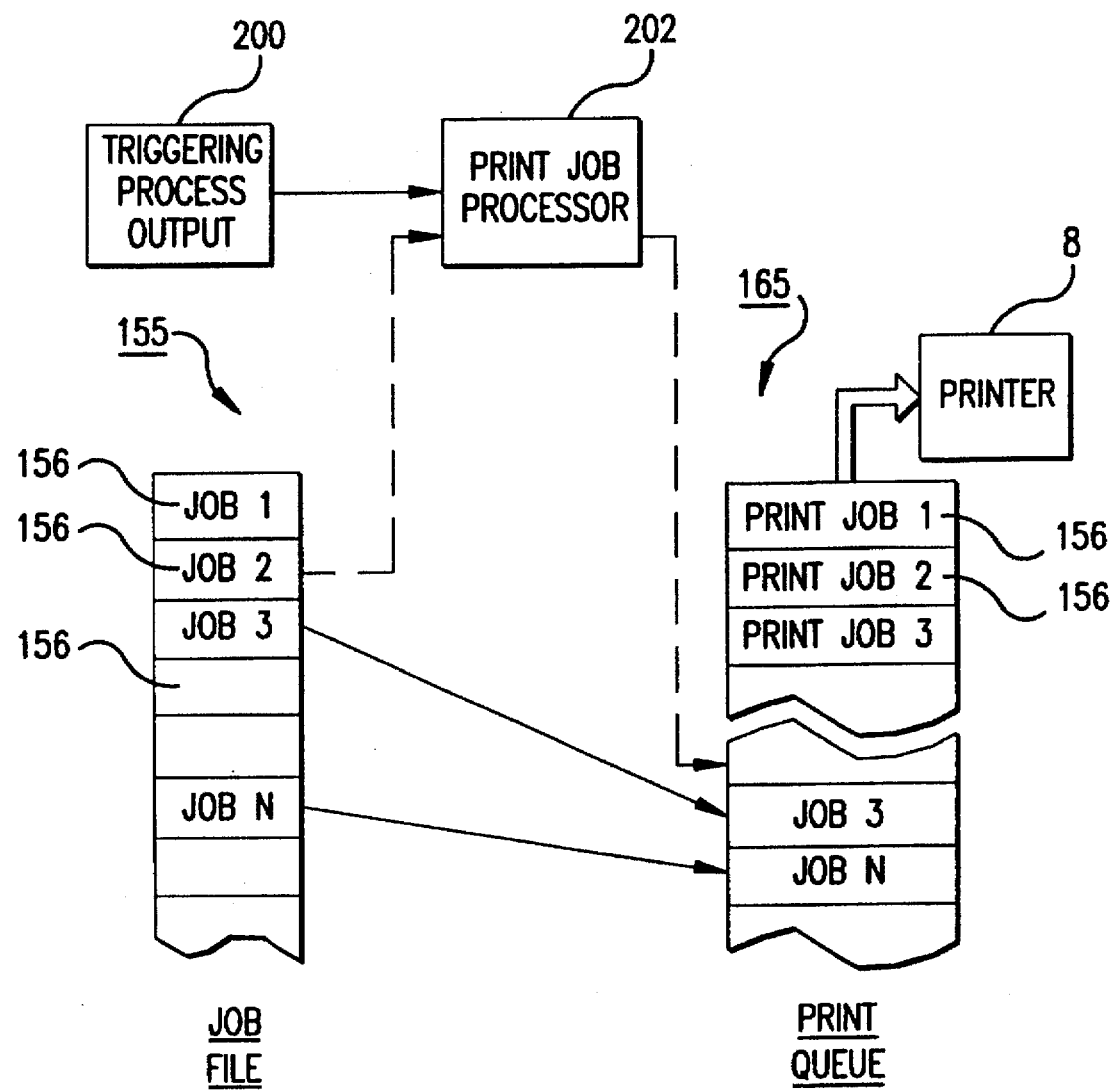

As one example, a system flow diagram illustrating inactive jobs stored in a job file and being moved to the print queue is shown in FIG. 5B. In this example, when the triggering event associated with a particular job occurs, that job is moved as specified by its job instruction set from its storage location in the job file to the print queue. In FIG. 5B, a triggering process output 200 is fed to a print job processor 202. The triggering process output 200 is the result of the triggering process sequence shown in FIGS. 10 and 11 and described below in greater detail. More specifically, the triggering process output 200 represents the outcome from the sequence of steps S6 through S12 in FIGS. 10 and 11.

The print job processor 202 that receives the triggering process output 200 includes the system control 54 (FIG. 2) and the image output control 60. In response to the triggering process output 200, the print job processor 202 accesses a job file 155 containing a plurality of inactive print jobs 156. For the purposes of this explanation, the job file 155 is primarily stored in the main memory 56. The print job processor 202 moves or copies one or more of the inactive print jobs 156 from the job file 155 to a print queue 165 primarily stored in the system memory 61. Because the job file and print queue memory configuration is within the level of one of ordinary skill in the art, further details of such are omitted. Of course, one of ordinary skill in the art would also recognize that the main memory 56 and system memory 61 could be configured as any type of data storage facility. The printer section 8 receives the print jobs in the order specified by the print queue 165.

When a particular job, e.g., Job 3, is in storage with other inactive jobs in the job file 155, Job 3 is not ordered with respect to the other inactive jobs (i.e., Jobs 1, 2 and 4-N). In other words, subsequent processing operations of inactive Job 3 are initiated based on the identity of Job 3, rather than, e.g., the order of Job 3 with respect to when the other jobs were first stored in the job file 155.

When Job 3 is stored in the print queue 165, however, Job 3 becomes ordered with respect to the other jobs in the print queue 165. The other jobs are also ordered with respect to one another. When Job 3 is in the print queue, its position is established in accordance with the print queue management rules in effect. For example, in a system operating under FIFO print queue rules, Job 3 follows the last of the other jobs already in the print queue and precedes the next job added to the print queue 165.

As is known, the order of a job already established in the print queue 165 can be changed with respect to the other established jobs. U.S. Pat. No. 5,287,194 to Lobiondo discloses a distributed printing method for routing, partitioning and prioritizing print jobs already in the print queue. According to the method disclosed in this patent, the end user submits the job to the print queue when the user desires to print the job. Based on available printer resources, the priority of the last-submitted job with respect to earlier-submitted jobs and/or other factors, the system responds by printing the last-submitted job immediately at one or more locations, indicating the time that the last-submitted job will finish printing or indicating that the last-submitted job cannot be printed. In each case, however, the last-submitted job is an active job submitted to the print queue in a condition ready for printing. Even if the last-submitted job is not immediately printed, it occupies a defined position in the print queue in order with respect to the other jobs in the print queue. In contrast to the claimed invention, the Lobiondo method does not relate to processing inactive jobs not necessarily intended for immediate printing and activating these jobs in response to a user defined event (which may or may not be time-based) for printing.

Figure 9:
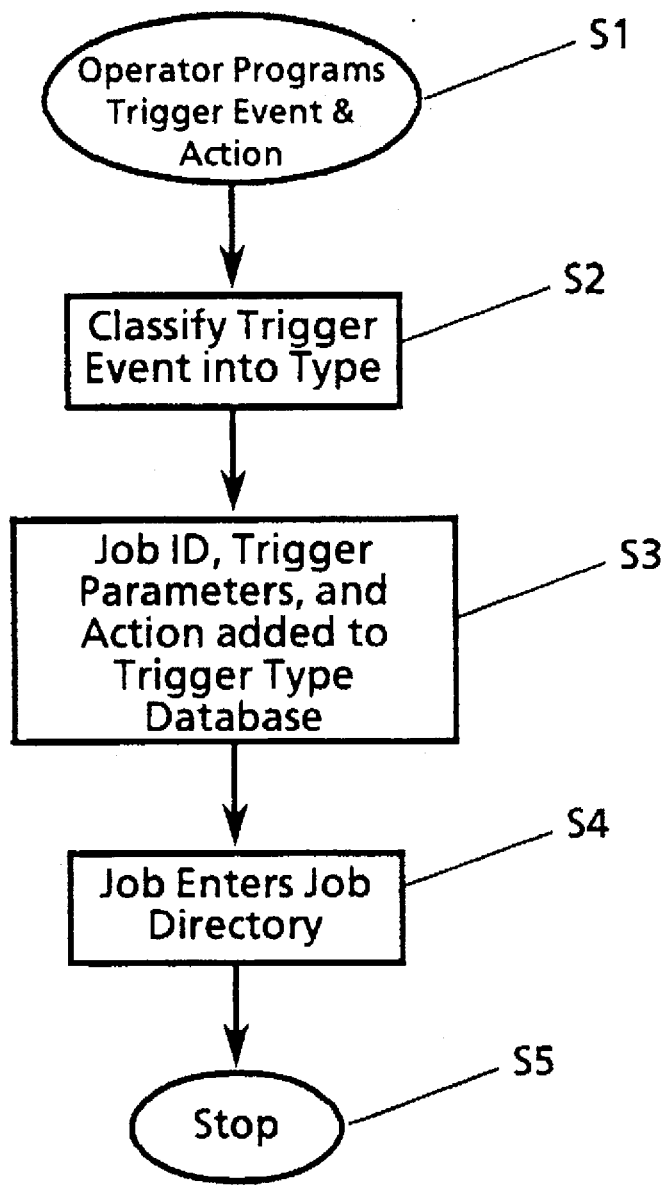
FIGS. 9–11 represent a high level flowchart of an operator selected deferred action for an inactive print job's procedure according to the present invention.
Figure 10:
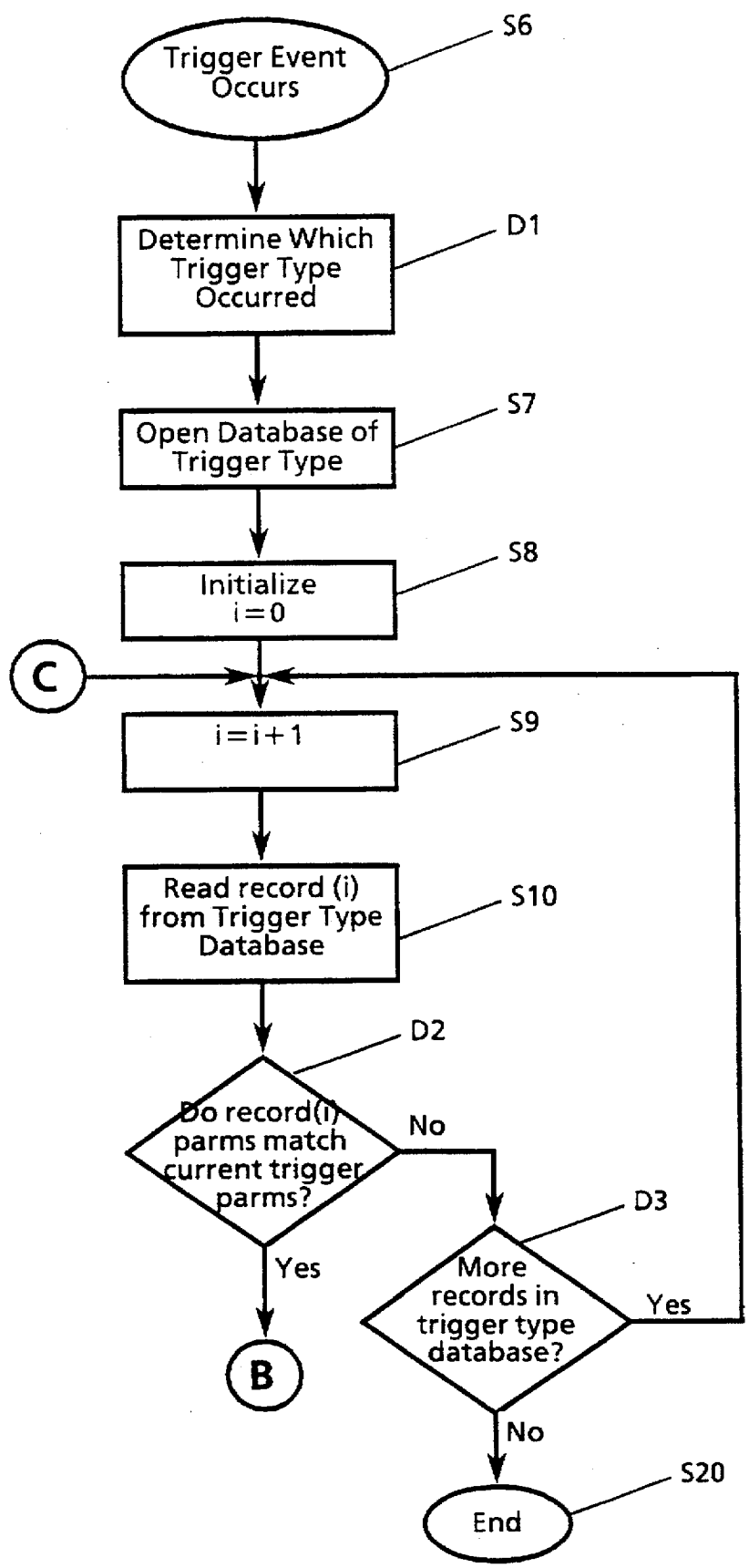
Figure 11:
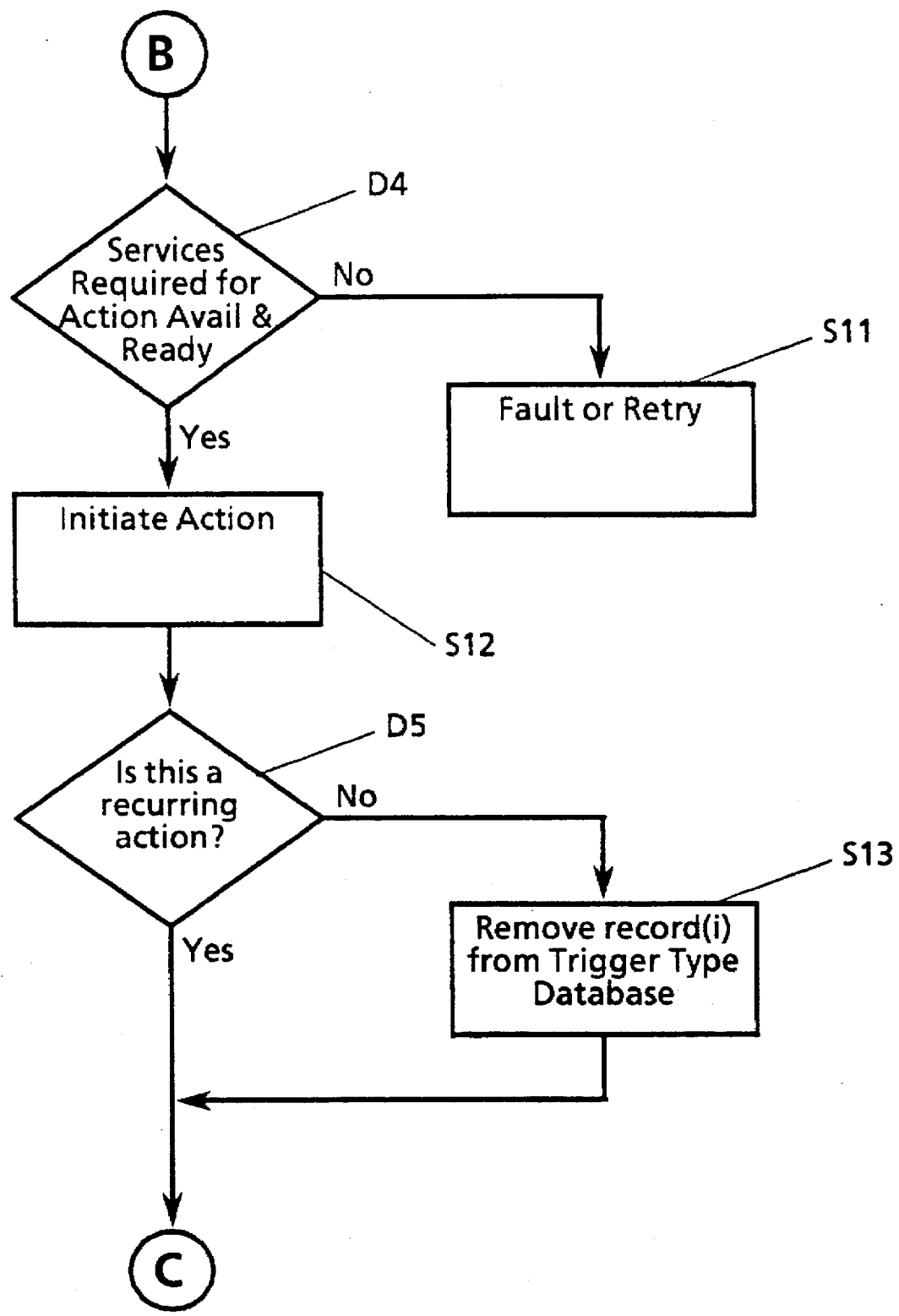

Referring now to FIGS. 9-11, the operation of the present invention will be described in detail. According to the present invention, the option of whether to implement operator selected deferred action for an inactive print job is presented to the operator via the User Interface (UI) 52 of the electronic reprographic system 2 shown in FIG. 1. In addition to a display device, the UI 52 may include a touch screen, keyboard, mouse, etc. or any combination thereof for input purposes. The operator may, for example, enter a job option screen on the UI 52 which presents a deferred action option to the operator. Generally, once the deferred action option is selected, the operator then enters the required information to effectuate an automatic deferred action for an inactive print job via the UI 52. Once the selections have been made and entered, the system will carry out the selected deferred actions on the inactive print job upon the occurrence of the preselected system operating condition that acts as a trigger for processing the inactive print job. An exemplary deferred action selection and implementation operation is described in detail below with reference to FIGS. 9–11 which depict flowcharts showing the operation of an electronic reprographic system in accordance with the present invention.

FIG. 9 shows the preferred implementation of operator specified deferred actions and associated trigger events in accordance with the present invention. Initially, the operator is presented with an inactive print job upon which certain selected actions are to be performed, upon the occurrence of an operator specified triggering event. The triggering event can be any one of a number of system operating conditions, such as, for example, date and time (specified in relative or absolute terms); resource availability (i.e., availability of system resources, such as, for example, print queues, cartridge tape drives, modems, file servers, finishing devices, fonts, etc.); operator logoff; operator logon; receipt or creation of a specified second print job, system transition to a quiescent state; etc. Given the presence of an inactive print job upon which deferred actions are to be performed, the operator selects the triggering event and the action to be taken S1. The triggering event is classified as one of a predetermined type of triggering event S2. After determining the classification of the triggering event, the job ID, trigger parameters and action are added to the database for that class of triggering events S3. The inactive print job is then placed, for example, in a system job directory located in the memory 56 which holds all inactive print jobs S4 or alternatively in a remote networked file server if the system supports networked operation. No further action is required S5 once the job has been placed in the system job directory or alternatively in a remote networked file server.

FIGS. 10–11 show a representation of the system operation after detection of a triggering event. When a triggering event occurs S6, such as, for example, a logoff function, the system must then determine which trigger type is associated with the triggering event D1, such as, for example, user access control. Once the system has determined which trigger type occurred D1, the system accesses the appropriate database associated with the type of triggering event detected S7. This database is arranged such that when an operator chooses which triggering event will be used to initiate the deferred action, these deferred action sequences are stored according to an inactive job identifier in a database corresponding to the type of triggering event chosen. Therefore, in this example, a triggering event such as a logoff, will initiate a search of the User Access Control database. The number and types of databases are chosen by system designers based on the desired operational characteristics of the system. These can range from one database per triggering event (maximum) to one database for all triggering events (minimum). The choice depends on a variety of system efficiency parameters. For example, if the system only has one or two triggering events, having only one triggering event database may be sufficient. If, however, there are a wide variety of possible triggering events, it may be more efficient to classify the triggering events into logical categories and have a database for each category. In this example, the latter occurs. Here, the trigger is a logoff function that logically resides in the User Access Control database.

Once the appropriate database has been opened S7, an index counter, i, is initialized to zero S8. The counter i is then incremented by one S9. The record in the database corresponding to the ith position is then read S10. The system then enters a decisional step D2 wherein it compares the ith record parameters to the currently detected trigger parameter, for example logoff. If the ith record trigger parameters do not match the operator selected triggering event, another decisional step is entered D3. In this step, the system determines whether any more records exist in the currently accessed database D3. If there are no more records in the database, the sequence ends S20. If, however, more records do exist in the current database, steps S9 thru D3 are conducted again.

If the trigger parameters of the ith record match the current trigger parameters in step D2, decisional step D4 is entered. In this step, the system determines whether system resources are available to carry out the desired preselected deferred actions D4. If the required resources are not currently available, the system may retry after a predetermined period of time, signal a fault to the operator or abort the deferred action entirely S11, consistent with system design for handling similar resource availability problems. If the resources are available in D4, the specified deferred action is accomplished S12. Once the deferred action for the inactive print job has been initiated, the record is checked to determine if the action has been programmed to be repeated D5. If the action is not a recurring action, then the record in the currently accessed database is removed S13 to avoid duplicative processing. In addition, the system repeats all the steps S9, S10, D2, D3, D4, S11, S12, S13 and S20 until the database has been completely and thoroughly checked for all operator selected deferred actions for the currently accessed database.

The operation described above with respect to a logoff function and a User Access Control database occurs for each triggering event and event type available on the system and selected by the operator. As described above, the outcome of the triggering process is inputted into the print job processor 202 (FIG. 5B) for subsequent processing.

Figure 12:
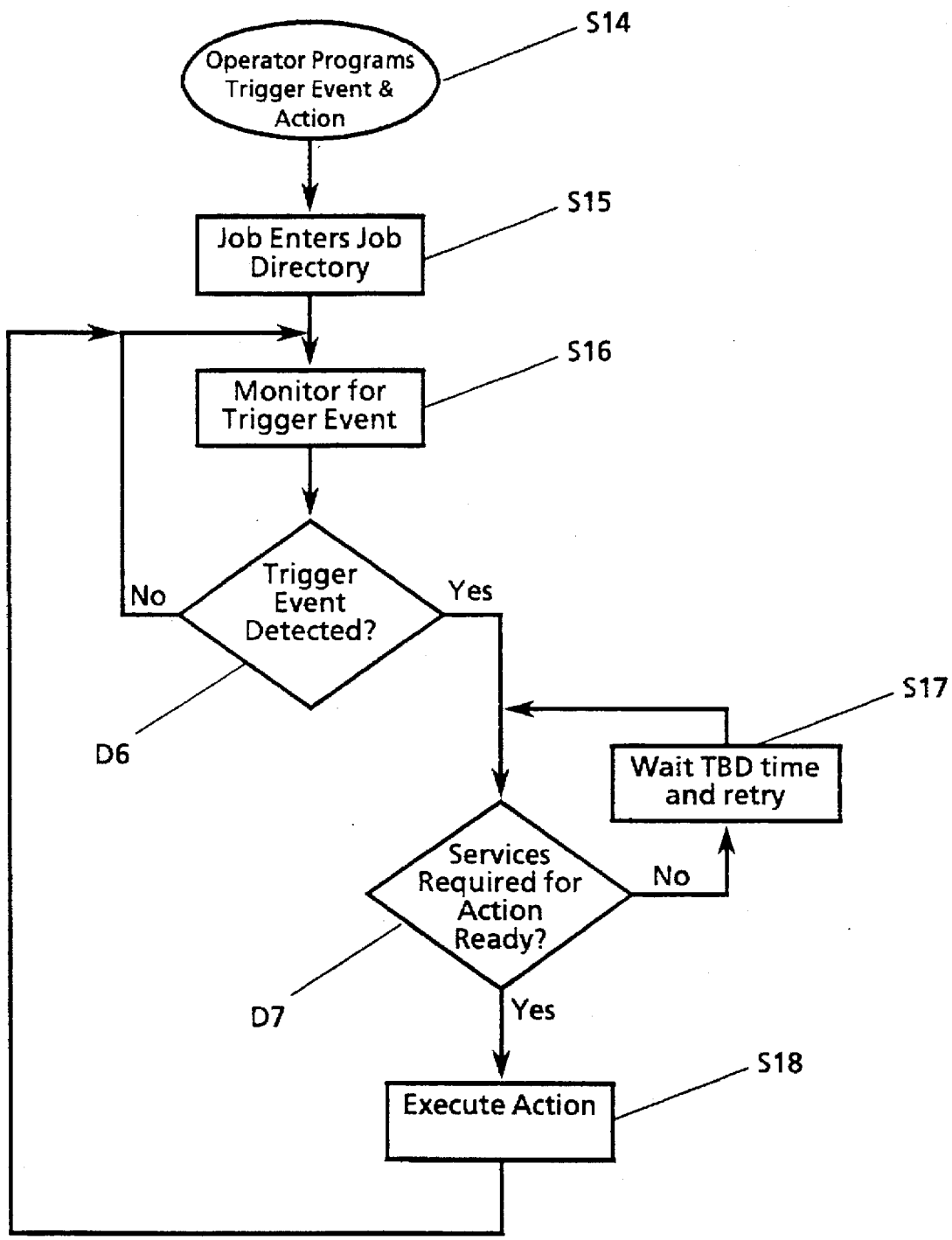
FIG. 12 represents a high level flowchart of an alternate embodiment of the present invention.

FIG. 12 shows a flowchart of an alternate implementation of this invention. Analogous to step S1 in the preferred embodiment, the operator selects the triggering event and the action to be taken S14. After the operator programming is complete, and analogous to step S4 in the preferred embodiment, the inactive print job is then placed, for example, in a system job directory located in the memory 56 which holds all inactive print jobs or alternatively in a remote networked file server if the system supports networked operation S15. The electronic printing system then continually monitors system activity to detect the occurrence of an operator selected triggering event S16.

The system continually monitors the potential triggering events during the monitoring phase S16 and the decisional phase D6. If during the decisional phase D6, a triggering event is detected, another decisional step must be entered to determine whether the services required for the deferred action are ready to implement the required action D7. For example, if an inactive job requires some action, the system must determine whether resources are available to carry out the operation required by the selected deferred action when the triggering event occurs. If the resources required to carry out the desired action are available, the system carries out the specified action S18. If, however, resources are not currently available to carry out the desired action, the system may wait for a predetermined period of time and then initiate a retry sequence S17 where the system again checks for the availability of processing resources D7. The system may also identify a failure or fault and require further operator action.

If, during the monitoring and decisional phases S16, D6, no triggering event is detected, the system will continue to monitor the status of the triggering events S16, D6 until a triggering event is detected.

Although the preferred embodiment described is a device controlled by one or more digital computers, the invention could be applied using any means of logic control, including but not limited to, the following: electronic, mechanical, or fluidics control systems using digital or analog processing.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as defined in the following claims.

What is claimed is:

1. An electronic reprographic machine for providing an operator with a deferred action function, comprising:
    a memory for storing an inactive print job and a triggering event, the triggering event including at least one of (i) a date and time, (ii) resource availability, (iii) operator log off, (iv) operator log on, (v) receipt of a specified print Job, (vi) creation of a specified print job, and (vii) system transition to a quiescent state, wherein the triggering event is defined by the operator;
    a user interface for associating a job processing instruction set and the triggering event with the inactive print job, the triggering event occurring after the inactive print job is associated with the job processing instruction set;
    an automatic triggering apparatus for automatically triggering access of the inactive print job and the job processing instruction set associated with the inactive print job in response to the triggering event associated with the inactive print job, the automatic triggering apparatus including a trigger type database for storing the job processing instruction set corresponding to the triggering event and the inactive print job based on a classification of the triggering event, the classification comprising a plurality of triggering types, wherein an automatic action specified by the operator is performed when the triggering event occurs; and
    a print job processor for moving the inactive print job into a print queue and for processing the inactive print job in accordance, with the associated job processing instruction set in response to an input received from the automatic triggering apparatus, wherein inactive print jobs are activated by the triggering event and are moved into the print queue in a predetermined order.

2. The electronic reprographic machine of claim 1, wherein the automatic triggering apparatus comprises:
    a triggering event status monitor for detecting the occurrence of the triggering event; and
    a discriminator for determining whether the triggering event detected by the status monitor is associated with any inactive print job stored in the memory.

3. The electronic reprographic machine of claim 1, wherein said automatic triggering apparatus includes a determining device for determining whether the electronic reprographic machine is capable of implementing the job processing instruction set when the triggering event is detected.

4. The electronic reprographic machine of claim 1, wherein the job processing instruction set includes a plurality of deferred actions.

5. The electronic reprographic machine of claim 4, wherein said plurality of deferred actions are sequentially linked.

6. An electronic reprographic machine capable of providing an operator with a deferred action function, comprising:
    storing means for storing an inactive print job and a triggering event, wherein the triggering event is defined by the operator;
    associating means for associating a job processing instruction set and the triggering event with the inactive print job, the triggering event occurring after the inactive print job is associated with the job processing instruction set;
    automatic accessing means for automatically accessing the inactive print job and the job processing instruction set associated with the inactive print job upon the occurrence of the triggering event associated with the inactive print job, the automatic accessing means including a trigger type database for storing the job processing instruction set corresponding to the triggering event and the inactive print job based on a classification of the triggering event, the classification comprising a plurality of triggering types, the automatic accessing means further including triggering event status means for detecting the occurrence of the triggering event and discriminating means for determining whether the triggering event detected by the status means is associated with any inactive print job stored in said storing means, wherein the triggering event is predetermined and an automatic action specified by the operator is performed when the triggering event occurs; and
    moving and processing means for moving the inactive print job into a print queue and for processing the inactive print job in accordance with the associated job processing instruction set, the processing means being responsive to the automatic accessing means, wherein inactive print jobs are activated by the triggering event and are moved into the print queue in a predetermined order.

7. The electronic reprographic machine of claim 6, wherein the associating means includes a user interface.

8. The electronic reprographic machine of claim 6, wherein the storing means includes a system memory.

9. The electronic reprographic machine of claim 6, wherein the automatic accessing means comprises:
    monitoring means for monitoring a status of the triggering event; and
    determining means for determining whether the triggering event is associated with the inactive print job.

10. The electronic reprographic machine of claim 6, wherein the automatic accessing means includes means for determining whether the electronic reprographic machine is capable of processing the inactive print job in accordance with the associated job processing instruction set.

11. A method of deferring action for inactive print jobs in an electronic printing system, comprising:

storing an inactive print job and a triggering event in a memory, the triggering event including at least one of (i) a date and time, (ii) resource availability, (iii) operator log off, (iv) operator log on, (v) receipt of a specified print job, (vi) creation of a specified print job, and (vii) system transition to a quiescent state, wherein the triggering event is defined by an operator;

associating a job processing instruction set and the triggering event with the inactive print job, the triggering event occurring after the inactive print job is associated with the job processing instruction set;

automatically triggering access of the inactive print job and the job processing instruction set associated with the inactive print job in response to the triggering event associated with the inactive print job;

selecting at least one triggering event to trigger performance of the associated job processing instruction set on the inactive print job;

storing the job processing instruction set corresponding to the triggering event and the inactive print job based on a classification of the triggering event in a trigger type database, the classification comprising a plurality of triggering types, wherein an automatic action specified by the operator is performed when the triggering event occurs; and moving the inactive print job from memory into a print queue and processing the inactive print job after the step of selecting in accordance with the associated job processing instruction set in response to the occurrence of the triggering event, wherein the inactive print jobs are activated by the triggering event and are moved into the print queue in a predetermined order.

12. The method of claim 11, wherein a set of system operating conditions is one of a predetermined set of system operating conditions.

13. The method of claim 11, wherein a job processing instruction set includes a plurality of deferred actions.

14. The method of claim 13, wherein the plurality of deferred actions are sequentially linked.

15. The method of claim 11, further comprising electronically communicating a reminder message associated with the inactive print job in response to detection of the triggering event.

16. The method of claim 15, wherein the step of electronically communicating includes displaying.

17. The method of claim 15, wherein the step of electronically communicating includes displaying at a remote location.

18. The method of claim 11, wherein the memory is a first memory and the electronic printing system includes a second memory containing the print queue, and wherein the step of moving includes moving the inactive print job from the first memory to the print queue in the second memory.

* * * * *

UNITED STATES PATENT AND TRADEMARK OFFICE
CERTIFICATE OF CORRECTION

PATENT NO. : 5,717,841

DATED : February 10, 1998

INVENTOR(S) : Michael E. FARRELL; Randall R. HUBE; and John F. GAURONSKI

It is certified that error appears in the above-indentified patent and that said Letters Patent is hereby corrected as shown below:

On the title page, please add the following:

--Related U.S. Application Data

[62] Continuation-in-Part of Ser. No. 049,290, April 20, 1993, now abandoned.--

Signed and Sealed this

Twenty-sixth Day of May, 1998

Attest:

BRUCE LEHMAN

*Attesting Officer*  *Commissioner of Patents and Trademarks*